Patented Jan. 10, 1950

2,494,326

UNITED STATES PATENT OFFICE 2,494,326

EMULSION POLYMERIZATION PROCESS

Erving Arundale, Westfield, N. J., assignor to Standard Oil Development Company, a corporation of Delaware No Drawing. Application July 3, 1945, Serial No. 603,115

3 Claims. (Cl. 260—82.7)

The present invention pertains to the production of synthetic rubber-like materials and in particular to the preparation of such materials by emulsion polymerization.

It is of course well known that synthetic rubber-like materials can be prepared by the polymerization of diolefins such as butadiene and its homologues or by the interpolymerization of such diolefins with copolymerizable materials such as styrene, alpha methyl styrene, vinyl naphthalene, acrylic acid nitrile, methacrylic acid nitrile, methyl methacrylate, ethyl fumarate, methyl vinyl ketone and the like. The preparation of such synthetic rubber-like materials is usually effected in aqueous emulsion using a compound capable of liberating oxygen such as hydrogen peroxide, benzoyl peroxide, sodium perborate or alkali metal persulfates as catalyst. Emulsifiers used in this process include water-soluble soaps such as alkali metal oleates and stearates as well as various synthetic surface active agents such as salts of alkylated benzene or naphthalene sulfonic acids, fatty alcohol sulfates and also certain acid addition salts of high molecular weight alkyl amines.

The polymers that have been obtained in this manner have as a general rule been found to be objectionable because of their lack of plasticity, particularly when the polymerization is conducted for a period sufficient to give high conversions of the monomeric materials used. This lack of plasticity gives rise to difficulties in the mastication of the rubber since it will not band readily on an open rubber mill and is equally difficult to handle in a mixer of the Banbury type. In order to overcome this objection, it has been proposed that auxiliary or modifying agents be added to the polymerization mixture in order to regulate the polymerization. U. S. Patent No. 2,281,613, for example, describes the addition of mercaptans having at least 6 carbon atoms in an aliphatic linkage to the polymerization mixtures to the end that the polymerization of butadiene hydrocarbons may be carried out in aqueous emulsion without retarding the course of the polymerization and without the formation of polymers which are highly insoluble in benzene.

It is an object of the present invention to provide the art with a novel method of preparing emulsion polymerizates of diolefins and particularly copolymers of butadiene hydrocarbons with one or more monoolefinic compounds.

It is a further object of this invention to provide the art with a method whereby emulsion polymerizates of butadiene hydrocarbons and emulsion copolymerizates of butadiene hydrocarbons and other copolymerizable compounds containing a single vinyl group of more uniform quality and improved properties may be obtained in higher yield and/or in shorter reaction times.

These and other objects will appear more clearly from the detailed description and claims which follow.

It has now been found that synthetic rubber-like materials of improved uniformity and better physical properties are obtainable if there is used as the polymerization modifier a mixture of aliphatic mercaptans comprising a major portion of C-12 mercaptan, and minor proportions of C-10, C-14, C-16 and higher mercaptans. It has been found that surprisingly these mixtures of mercaptans are considerably more effective as polymerization modifiers than pure decyl, dodecyl, tetradecyl or hexadecyl mercaptans used singly. The results obtained with these mixtures are quite different from the mean of the results obtained with the same mercaptans used singly.

This invention is applicable to the emulsion polymerization of butadiene hydrocarbons singly or in mixtures as well as with compounds containing a single C=C linkage and capable of forming copolymerizates with butadienes. Some butadienes which may be polymerized in accordance with the present invention include butadiene-1,3 and the homologues thereof, particularly isoprene, piperylene, and dimethyl butadiene or hexadiene-2,4. The copolymerizable materials containing a C=C linkage include for example such compounds as styrene, alpha methyl styrene, paramethyl styrene, chloro styrenes, acrylic acid nitrile, methacrylic acid nitrile, acrylic and methacrylic acid esters, fumaric acid esters, unsaturated ketones, such as methyl vinyl ketone, methyl isopropenyl ketone and 1—1 dichloroethylene.

The catalysts which may be used in the polymerization are substances which are capable of liberating oxygen under the conditions employed in the polymerization and include hydrogen peroxide, benzoyl peroxide, alkali metal or ammonium perborates or persulfates. The catalysts are used in amounts of about 0.1% to about 0.3% based upon the water present. The ratio of water to monomeric polymerizable materials should be between 2 to 1 and 1.25 to 1 on a weight basis.

The emulsifiers used are the sodium potassium or ammonium salts of high molecular weight fatty acids, alkali metal salts of alkylated naphthalene sulfonic acids or fatty alcohol sulfates and the amount thereof is generally from about 1% to about 5% based upon the water in the polymerization mixture.

The modifiers used in accordance with this invention are mixtures of aliphatic mercaptans having an average molecular weight of 188–230 and containing at least 50% of dodecyl mercaptan, the remaining 50% being mercaptans containing from 10 to 16 carbon atoms in the molecule. Such a mixture of mercaptans can be prepared by blending pure individual mercaptans or by converting a suitable mixture of $C_{10}$ to $C_{16}$ alcohols, for example, "Lorol" alcohol (Du Pont) containing approximately 55% of $C_{12}$, 30% of $C_{14}$ and 15% of $C_{16}$ alcohols, directly to the corresponding mercaptans. The range of composition of the mercaptan mixtures used in accordance with this invention is as follows:

$C_{10}$ mercaptans—Maximum of 15%, preferably less than 10%

$C_{12}$ mercaptans—50–75%, preferably about 53–65%

$C_{14}$ mercaptans—15–35%, preferably about 20–30%

$C_{16}$ and higher mercaptans—Maximum of 20%, preferably about 5–15%

The modifiers are used in amounts of between about 0.125% and 1.0% based on the monomers present in the emulsion.

The mercaptan may be added to the polymerization mixture in solution in one of the monomers which takes part in the polymerization, for example, in acrylonitrile if "Perbunan" type polymers are being prepared or in styrene if "Buna-S" type polymers are being prepared or in the diolefin itself. The mercaptan may also be added as an emulsion in the soap solution.

The following examples will serve to illustrate my invention, but it is to be understood that the invention is by no means limited thereto.

EXAMPLE 1

The following ingredients were charged to a small stainless steel autoclave which was equipped with a turbine type agitator:

|  | Parts |
| --- | --- |
| Butadiene | 680 |
| Acrylonitrile | 238 |
| Water | 1740 |
| Oleic acid | 36 |
| 1-normal NaOH | 120 |
| Dodecyl mercaptan | 4.6 |
| Potassium persulfate | 3.1 |

About 2 gallons of this reaction mixture was heated at 40° C. for six hours while vigorously agitating the mixture and at that time the resultant latex was dropped from the reactor through a bottom valve, short stopped by the addition of 3.5 parts hydroquinone as a 2% solution in water whereupon phenyl-beta-naphthylamine in emulsion equivalent to 2% by weight of the polymer was added, whereupon the polymer was precipitated by the addition of brine. The brine and soap were removed from the coagulate by washing with water and the polymer crumbs dried at 170° F. in a hot air oven.

The polymer was compounded according to the following recipe, cured at 287° F. for 45 minutes, and evaluated.

|  | Parts |
| --- | --- |
| Polymer | 100 |
| Coal tar softener | 4 |
| Rosin | 4 |
| Wax | 1.5 |
| Stearic acid | 1.5 |
| Zinc oxide | 5 |
| Altax (benzothiazyl disulfide) | 1.25 |
| Diphenyl guanidine | 0.25 |
| Channel black | 45 |
| Sulfur | 1.5 |

The foregoing procedure was repeated except that 3.8 parts and 1.9 parts of a mixture of mercaptans consisting of 55% of $C_{12}$, 30% of $C_{14}$ and 15% of $C_{16}$ mercaptans were substituted for the 4.6 parts of dodecyl mercaptan.

The foregoing procedure was also repeated except that 4.68 parts of pure myristyl ($C_{14}$) mercaptan was used as the mercaptan modifier.

The results obtained in the foregoing runs are summarized in Table I:

Table I

| Mercaptan | Conc. of Mercaptan Based on Water Present | Conversion | Time @ 40° C. | Tensile Strength | Elongation | Williams Plasticity-Recovery |
| --- | --- | --- | --- | --- | --- | --- |
|  | Percent | Percent | Hours | Lbs./sq. in. | Percent |  |
| Dodecyl | 0.26 | 70 | 6 | 3,950 | 725 | 116-3 |
| $C_{12}$-$C_{16}$ Mixture [1] | 0.22 | 70 | 7 | 4,330 | 800 | 112-8 |
| $C_{12}$-$C_{16}$ Mixture [1] | 0.11 | 55 | 7 | 4,650 | 750 | 165-55 |
| Myristyl ($C_{14}$) | 0.27 | 52 | 17 (35° C.) | 3,800 | 700 | 163-76 |

[1] The $C_{12}$-$C_{16}$ mixture contained 55% $C_{12}$ mercaptan; 30% $C_{14}$ mercaptan; 15% $C_{16}$ mercaptan.

It may readily be seen from the foregoing data that the product obtained when using the $C_{12}$-$C_{16}$ mercaptan mixture had the highest tensile strength and elongation and was more plastic than the products obtained when using even greater concentrations of pure dodecyl or pure myristyl mercaptan. It may further be seen that only half as much of the mercaptan mixture is needed to give a product of substantially the same properties as obtained when using myristyl mercaptan.

EXAMPLE 2

The following ingredients were charged to one quart stainless steel bombs:

|  | Parts |
| --- | --- |
| Butadiene | 74 |
| Acrylonitrile | 26 |
| Water | 200 |
| Oleic acid | 3.9 |
| 1-normal NaOH | 13 |
| Mercaptan (variable as indicated in Table II) |  |
| Potassium persulfate | .36 |

The bombs containing the reaction charge were placed on a mechanical shaker and agitated in an air bath maintained at about 32–35° C. for 16 hours. The resultant latex was stabilized with 2% of phenyl beta naphthylamine and coagulated by means of brine whereupon the coagulate was washed, dried and compounded, cured and evaluated as in Example 1. The data obtained is summarized in Table II below.

Table II

| Mercaptan | Conc. of Mercaptan Based on Total Reactants | Conversion | Tensile Strength | Per Cent Elongation | Williams Plasticity-Recovery |
|---|---|---|---|---|---|
| | | | Lbs./sq. in. | | |
| Decyl | 0.32 | 73 (16 Hrs.) | 3,670 | 800 | 119–7 |
| Dodecyl | 0.44 | 72 (16 Hrs.) | 3,450 | 680 | 112–10 |
| $C_{12}$–$C_{16}$ Mixture [1] | 0.44 | 70 (16 Hrs.) | 3,900 | 750 | 115–6 |
| $C_{10}$–$C_{12}$ Mixture [2] | 0.50 | 83 (20 Hrs.) | 3,320 | 650 | 138–27 |

[1] $C_{12}$–$C_{16}$ mixture contained 55% $C_{12}$ mercaptan, 30% $C_{14}$ mercaptan and 15% $C_{16}$ mercaptan.
[2] $C_{10}$–$C_{12}$ mixture contained 50% $C_{10}$ mercaptan and 50% $C_{12}$ mercaptan.

These data show that the $C_{12}$–$C_{16}$ mixture of the present invention are superior to either $C_{10}$ or $C_{12}$ mercaptans used singly or in 50–50 mixtures.

EXAMPLE 3

The following ingredients were charged to one quart glass pressure bottles:

| | Parts |
|---|---|
| Butadiene | 74 |
| Acrylonitrile | 26 |
| Water | 200 |
| Sodium salt of selectively hydrogenated Tallow acids (85% neutralized) | 4 |
| Mercaptan | ([1]) |
| Potassium persulfate | 0.3 |

[1] Variable as indicated in Table III.

The bottles containing the reaction charge were fastened on to a rotating wheel mounted in a constant temperature water bath. All the runs were for 16 hours at 28° C. The latex formed was stabilized, coagulated, washed, dried, compounded, cured and evaluated as in Example 1. The data obtained is summarized in Table III below.

It may be noted from the above data wherein the several individual mercaptans were used in equimolar amounts that the $C_{10}$ and $C_{12}$ mercaptans give soft products but ones which vulcanize to give vulcanizates of low tensile, although the $C_{12}$ mercaptan is somewhat superior of the two. The $C_{14}$ and $C_{16}$ mercaptans give tough products of high tensile strength, although the $C_{14}$ mercaptan is somewhat superior to the $C_{16}$. The mixture of $C_{12}$–$C_{16}$ mercaptan, on the other hand, gives a product which is as soft as that obtained with $C_{10}$ or $C_{12}$, but one which has a tensile strength equal to those obtained when using either $C_{14}$ or $C_{16}$. In case of the mixture of $C_{10}$–$C_{14}$ mercaptans which has a mean molecular weight equivalent to dodecyl mercaptan, the product obtained has a tensile better than that obtained when using dodecyl mercaptan but also the product is less plastic. This last example illustrates that all mixtures of mercaptans are not better than the individual mercaptans, but that the mixture must be rather specific.

The foregoing description contains a limited number of embodiments of the present invention. It will be understood that these examples are merely illustrative of the present invention and that numerous variations are possible without departing from the scope of the following claims.

This application is a continuation in part of my application Serial No. 450,919, filed July 14, 1942, which application has since issued as U. S. Patent 2,434,536.

What I claim and desire to secure by Letters Patent is:

1. In the manufacture of synthetic rubber-like materials by the polymerization in aqueous emulsion of a conjugated diolefin having from 4 to 6 carbon atoms per molecule, the improvement which comprises using as polymerization modifier 0.125 to 1.0% based on total monomer of an aliphatic mercaptan mixture consisting of about 55% dodecyl, about 30% tetradecyl and about 15% hexadecyl mercaptan.

Table III

| Mercaptan | Conc. of Mercaptan Based on Total Reactants | Conversion | Tensile Strength | Elongation | Modulus at 300% Elong. | Williams Plasticity-Recovery |
|---|---|---|---|---|---|---|
| | Percent | | Lbs./sq. in. | Percent | | |
| Decyl | 0.43 | 66 | 2,660 | 775 | 495 | 86– 0 |
| Dodecyl | 0.50 | 62 | 3,150 | 735 | 500 | 74– 0 |
| Tetradecyl | 0.57 | 69 | 4,210 | 620 | 980 | 160– 67 |
| Hexadecyl | 0.65 | 63 | 3,890 | 420 | 2,195 | 214–116 |
| $C_{12}$–$C_{16}$ mixture [1] | 0.50 | 65 | 3,940 | 705 | 755 | 64– 0 |
| $C_{10}$–$C_{14}$ mixture [2] | 0.50 | 73 | 3,530 | 715 | 685 | 120– 21 |

[1] $C_{12}$–$C_{16}$ mixture contained 55% dodecyl mercaptan, 30% tetradecyl mercaptan and 15% hexadecyl mercaptan.
[2] $C_{10}$–$C_{14}$ mixture was an equal molar mixture of decyl, dodecyl and tetradecyl mercaptans.

2. In the manufacture of synthetic rubber-like materials by the polymerization in aqueous emulsion of butadiene-1,3 and acrylonitrile, the improvement which comprises using as polymerization modifier 0.125 to 1.0% based on total monomer of an aliphatic mercaptan mixture consisting of about 55% dodecyl, about 30% tetradecyl and about 15% hexadecyl mercaptan.

3. In the manufacture of synthetic rubber-like materials by the polymerization in aqueous emulsion of butadiene-1,3 and styrene, the improvement which comprises using as polymerization modifier 0.125 to 1.0% based on total monomer of an aliphatic mercaptan mixture consisting of about 55% dodecyl, about 30% tetradecyl and about 15% hexadecyl mercaptan.

ERVING ARUNDALE.

REFERENCES CITED

The following references are of record in the file of this patent:

UNITED STATES PATENTS

| Number | Name | Date |
|---|---|---|
| 2,384,969 | Serniuk | Sept. 18, 1945 |
| 2,401,346 | Fryling | June 4, 1946 |
| 2,416,440 | Fryling | Feb. 25, 1947 |

FOREIGN PATENTS

| Number | Country | Date |
|---|---|---|
| 843,903 | France | Apr. 3, 1939 |